(12) United States Patent
O'Rourke et al.

(10) Patent No.: US 6,576,279 B1
(45) Date of Patent: Jun. 10, 2003

(54) METHOD FOR THERMAL PROCESSING AND ACIDIFICATION OF PASTA PRODUCTS

(75) Inventors: Joseph O'Rourke, Lewis Center, OH (US); John Arnold Tunstall, Dublin, OH (US); Steven Clark Howe, Hillard, OH (US); Lloyd Joseph Moberg, Westerville, OH (US)

(73) Assignee: Kraft Foods North America, Inc., Northfield, IL (US)

( * ) Notice: Subject to any disclaimer, the term of this patent is extended or adjusted under 35 U.S.C. 154(b) by 0 days.

(21) Appl. No.: 09/466,137

(22) Filed: Dec. 21, 1999

(51) Int. Cl.⁷ .................. B65D 85/00; A21D 8/00; A23L 3/00
(52) U.S. Cl. ............ 426/128; 426/293; 426/296; 426/451; 426/557; 426/509
(58) Field of Search .................. 426/436, 407, 426/412, 523, 335, 326, 128, 293, 296, 557, 451, 509

(56) References Cited

U.S. PATENT DOCUMENTS

| | | | | |
|---|---|---|---|---|
| 4,764,390 A | * | 8/1988 | Zukerman et al. | 426/438 |
| 5,132,127 A | * | 7/1992 | Wisdom | 426/549 |
| 6,203,840 B1 | * | 3/2001 | Meyer et al. | 426/557 |

* cited by examiner

*Primary Examiner*—Nina Bhat
(74) *Attorney, Agent, or Firm*—Stevens, Davis, Miller & Mosher, L.L.P.

(57) ABSTRACT

A method of making a shelf stable pasta, rice or noodle product, a shelf stable pasta rice or noodle product produced by that method is described.

20 Claims, 1 Drawing Sheet

METHOD FOR THERMAL PROCESSING AND ACIDIFICATION OF PASTA PRODUCTS

BACKGROUND OF THE INVENTION

1. Field of the Invention

The present invention is in the field of food science, particularly that relating to the preparation of farinaceous products, such as shelf-stable pasta, pasta-like products, noodles, rice and similar products for use in a wide variety of ready to eat meal preparations. The present invention relates to the preparation of pasta, noodles, rice and similar products and more particularly to the preparation of fully cooked, shelf-stable pasta, noodle, rice and similar products.

2. Description of the Related Art

Pasta, rice, noodles and similar products have become a widely used source of nutrition for a variety of meal preparations. Pasta, rice and noodles are typically sold in dry form, but, more recently, shelf-stable pasta products have been developed that allow the consumer to prepare pasta meals.

In preparing shelf-stable pasta, rice, noodles and similar products directly, it has been difficult to provide sufficient thermal treatment and acidification while controlling the total thermal transfer to the product prior to packaging. Therefore, a need exists to provide shelf-stable pasta, noodle, rice and similar products with sufficiently attenuated bacteria to maintain their shelf stability, while maintaining the desirable firmness and organoleptic properties, particularly mouth feel properties of the pasta, noodles, rice and other similar products.

Although the invention will now be described in detail with respect to pasta, it will be appreciated that similar advantages of shelf stability and maintained firmness and organoleptic properties, as well as other advantages, may be obtained in other applications of the present invention to noodles, rice, pasta-like and similar products. Such advantages may become apparent to one of ordinary skill in the art in light of the present disclosure or through practice of the invention.

SUMMARY OF THE INVENTION

The present invention includes a method of making a shelf-stable pasta, noodle, rice or similar product, a shelf-stable pasta, rice, noodle or similar product by that method, and an apparatus adapted to make such shelf-stable products.

The apparatus of the present invention is adapted to prepare such cooked products, and comprises, in series: (a) a heated blancher drum; (b) an acidification drum comprising a drum and an acid application dispenser adapted to supply the interior of the acidification drum with an acidulent; and (c) a heated holding drum.

The apparatus preferably, but not necessarily, additionally comprises a conveyor to convey a pasta or other product from the heated blancher drum to the acidification drum. The apparatus also preferably, but not necessarily, additionally comprises a conveyor to convey the product from the acidification drum to the heated holding drum.

The blancher may be any type of cooking apparatus appropriate to blanch the pasta, rice, etc. and it may be selected from any of those apparatus known in the art. The blancher preferably uses steam heat.

The acid application dispenser may be any type of apparatus appropriate to acidify the pasta, noodles, etc. and it may be selected from any of those apparatus known in the art. Preferably, the acid application dispenser is a spray applicator.

A preferred embodiment of the process of the present invention comprises a process for preparing a shelf-stable pasta, rice or other product in a final cooked state. It comprises: (a) cooking a dried or freshly formed pasta, noodles or similar product for sufficient time and at sufficient temperature to cook the product to a cooked state less than the final cooked state; followed by (b) subjecting the partially cooked product to acidification at an elevated temperature to achieve a desired pH; and then (c) maintaining the acidified pasta, noodles or rice at an elevated temperature for a time sufficient to substantially attenuate the microorganism and spore content of the pasta, rice, noodles or similar product. The collective time/temperature of steps (a), (b), (c) are designed to achieve the desired degree of cooking to provide a product (pasta, rice, noodle, etc.) having desirable firmness, shape and appearance in addition to achieving microbial stability.

During blanching/cooking step (a), the product, e.g., pasta, may be cooked to any non-final state, but will typically be cooked to a point that will result in the pasta, etc. being sufficiently wetted to receive thorough acidification. Typically, the cooking step (a) is carried out at a temperature of from about 200° F. to about 212° F., preferably about 200° F. to about 210° F., and for a time of from about 2 to about 15 minutes, typically 4 to about 10 minutes. More or less time may be needed depending on the product; various shapes and grains types. Time may also vary due to using dry, rather than freshly formed, e.g. extruded, pasta. Those skilled in the art should recognize that the time and temperature may vary according to the particular product.

The acidification step (b) and thermal treatment step (c) is carried out at a temperature and a pH for sufficient time to thoroughly acidify, and hold at elevated temperature, the pasta to attenuate the bacteria count in the pasta product. The degree of attenuation can be determined through methods known in the art. Typically, the acidification is carried out at a pH of from about 3.6 to 4.6, and for a time of from about 1 to about 5, typically about 1 to about 3, minutes. The time may be varied to ensure sufficient penetration of acid; e.g., thicker dimensions requiring longer times. Once acidified, the additional thermal treatment typically is carried out at a temperature of about 180° F. to about 210° F., and for a time of from about 1 to about 5 minutes. These parameters may be varied while still obtaining the desired result. The product may subsequently be packaged.

The present invention also includes a process for preparing a packaged shelf-stable pasta, rice, noodle or grain based product in a final cooked state. The process comprises: (a) cooking a dried or freshly extruded pasta product, rice, noodle or grain based product for sufficient time and at sufficient temperature to cook the pasta to a cooked state less than the final cooked state; followed by (b) subjecting the pasta to an acidification step at elevated temperature, then (c) thermal treatment sufficient to substantially attenuate the microorganism and spore content of the product while achieving product in a cooked fully and hydrated state, followed by (d) packaging the product.

The product may be packaged using methods and equipment known in the art. It is preferred that the product is packaged while maintaining it at a temperature sufficient to maintain it substantially attenuated in microorganism and spore content. The process may optionally involve the step of pasteurizing to maintain microbial stability once the product is packaged.

During the processing, hot water or aqueous mixtures, such as acidified water, may be sprayed on the pasta, rice or noodles, etc., to lubricate the same and assist or complete cooking. Additionally or alternatively, a spray of an edible oil may be used to lubricate, aid in movement, and keep pieces of product from sticking together. The oil spray may be introduced during processing and/or in the final package.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

Figure 1:
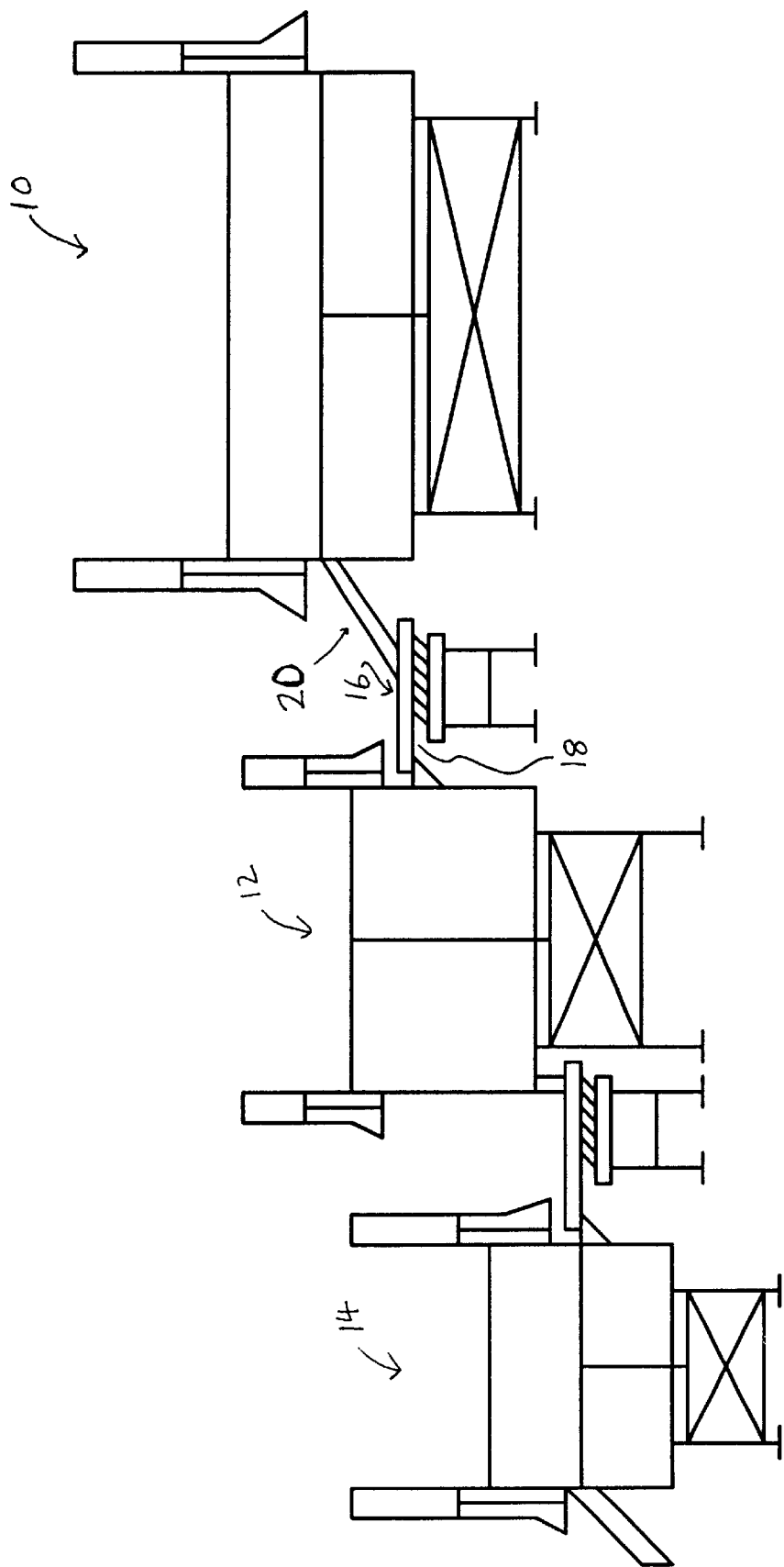
FIG. 1 is a side elevation view of a preferred embodiment of the apparatus of the present invention.

In accordance with the foregoing summary and the appended drawing, the following includes a detailed description of the preferred embodiment of the invention.

The following is a known process for making a shelf-stable product. First, a pasta product, e.g., stranded pasta, is cooked using a continuous blancher (not shown). The pasta is then transferred to a rotating acidification and holding drum (not shown). While continuing to maintain a hot temperature, acid is sprayed onto the product in the acidification and holding drum. The acidified pasta is maintained in the acidification and holding drum for a sufficient time to allow the acid to penetrate the product and reduce the pH to a desired level and sufficient time at an elevated temperature such that a thermal kill of microorganisms and spores occurs.

However, one disadvantage of this process is that an adjustment to the acidification and holding drum to increase residence time results in decreased throughput and increased product quality variation.

The inventors of the present invention have discovered that surprisingly improved results are achieved by separating the acidification step and the thermal treatment or thermal hold step. In order to separate the acidification step and the thermal hold step, a separate thermal hold container is added for the thermal hold step. This allows the acidification and holding drum to be used exclusively for acidification and the thermal hold container can be separately controlled i.e. residence time or conveying speed through the container slowed to provide the desired thermal hold at the desired pH. As a result, the present invention enables the times, temperatures, and pH to be more accurately controlled to achieve the destruction of microorganisms and spores.

As shown in FIG. 1, a blancher 10, a coating drum 12 and a thermal hold drum 14 comprise the apparatus of the invention. Optionally related equipment, such as conveyers, distribution or packaging apparatus may be employed in conjunction with the invention.

Pasta, rice, noodles or any other appropriate product, may be transferred to the blancher 10 by an appropriate device or by hand. For example, the product may be transferred to the blancher 10 by a bucket elevator (not shown) for dry pasta or a conveying belt (not shown) for freshly extruded pasta. The blancher 10 receives and partially cooks the product for sufficient time and at sufficient temperature. As used herein, the term "partially cook" is intended to mean a cooked state that is less than a desired final cooked state. Those skilled in the art should recognize that the desired final cooked state may vary according to the product and the intended application. It is preferred that the product is continuously transferred through the blancher 10 as it is being partially cooked.

The partially cooked product exists the blancher 10, and is transferred to the coating drum 12. The partially cooked product may be transferred to the coating drum 12 by any appropriate device or means. In this embodiment, the partially cooked product exists the blancher 10 via a chute 20. The chute 20 delivers the partially cooked product to a conveying system 16, e.g., a conveyor belt 18. The conveying system 16 then transfers the partially cooked product to the coating drum 12. The conveying system 16 may include means to weigh the product transferred, such as a weighing belt, scale, etc. Weighing permits accurate control of the correct ratio of product to acid, water, oil or other sprays, flavorings, seasonings or additional coatings.

The coating drum 12 may be any device that is appropriate to acidify the partially cooked product. It is preferable if the acidulent is continuously sprayed on the product as it is conveyed through the coating drum 12.

The acidulent is preferably diluted with water in order to achieve better coating of the partially cooked product. Examples of the acidulent include acetic acid, citric acid, tartaric acid, hydrochloric acid, malic acid, propionic acid, adipic acid, flimaric acid, phosphoric acid, lactic acid, sorbic acid, benzoic acid, and mixtures thereof. The acidulent preferably reduces the pH of the partially cooked product to between about 3.5 and about 4.6, preferably about 3.6 to about 4.6, and more preferably to between about 3.7 and about 4.2. The acidification drum contains flights to lift, mix and/or convey the product thereby promoting even acid coating and controlled product flow.

Suitable lubricants include edible oils such as corn oil, unsaturated safflower oil, palm oil, olive oil, peanut oil, coconut oil, sunflower oil, hydrogenated oil, partially hydrogenated oil and other similar oils.

The coated, partially cooked pasta or other product is transferred from the coating drum 12 to the thermal hold drum 14. The holding drum 14 is used to maintain the acidified product at the desired temperature and time with minimal variation of product quality at different rates of throughput. Residence time in the thermal hold drum 14 can be varied by changing the speed of conveyed product through the thermal hold drum 14 or by increasing the length of such drum. The range of residence time of product in the thermal hold drum 14 is generally greatly reduced in comparison to a single drum operation.

An additional advantage is gained because high throughput can be achieved independent of the desired residence time. The single coating drum operation sacrifices throughput when increased residence times are desired.

The pasta or other product may then be packaged while still hot once acidification and the thermal hold have been accomplished. If packaging materials have not been sterilized, a pasteurization step to thermally treat the packaging material may be used.

This process differs from the previously used methods at least by the addition of a separate controlled step to provide the thermal hold that is necessary to achieve shelf stability.

The preferred embodiments herein disclosed are not intended to be exhaustive or to unnecessarily limit the scope of the invention. The preferred embodiments were chosen and described to explain the principles of the present invention so that others skilled in the art may practice the invention. Having shown and described preferred embodiments of the present invention, those skilled in the art will realize that many variations and modifications will provide the same result and fall within the spirit of the claimed invention. It is the intention, therefore, to limit the invention only as indicated by the scope of the claims.

What is claimed is:

1. A process for preparing a shelf stable pasta product in a final cooked state, comprising:
   (a) cooking a dried or freshly formed pasta product for sufficient time and at sufficient temperature to cook said product to a partially cooked state less than said final cooked state; followed by
   (b) subjecting said partially cooked product to an acidification at an elevated temperature to achieve a desired pH; followed by
   (c) transferring and maintaining the acidified product at an elevated temperature for a time sufficient to attenuate the microorganism and spore content of said product while maintaining said product in a cooked state less than said final cooked state; and further cooking said product for sufficient time and at sufficient temperature to cook said product to said final cooked state.

2. The process of claim 1, wherein said cooking step (a) is carried out at a temperature of from 200° F. to 210° F., and for a time of from 2 to 15 minutes.

3. The process of claim 1, wherein said step (b) acidification is carried out at a pH of from 3.6 to 4.6 and for a time of from 1 to 5 minutes.

4. The process of claim 1, wherein said acidification is carried out at a temperature of from 180° F. to 210° F., and for a time of 1 to 5 minutes for the acidification step, and for a time of 1 to 5 minutes for the thermal treatment step.

5. The process of claim 1, wherein said further cooking step (c) is carried out at a temperature of from 180° to 210° F., and for a time of from 1 to 5 minutes.

6. The process of claim 1, wherein said subjecting step occurs in an acidification vessel and said maintaining at an elevated temperature step occurs in a thermal hold vessel and said product is transferred from said acidification vessel to said thermal hold vessel.

7. The process of claim 1, wherein the farinaceous product is selected from the group consisting of pasta, noodles and rice.

8. A process for preparing a packed shelf stable pasta product in a final cooked state, comprising:
   (a) cooking a dried or freshly formed pasta product for sufficient time and at sufficient temperature to cook said product to a partially cooked state less than said final cooked state; followed by
   (b) subjecting said partially cooked product to an acidification sufficient to attenuate the microorganism and spore content of said product while achieving product in a partially cooked and hydrated state; followed by
   (c) transferring and subjecting the partially cooked product to a thermal treatment to fully cook and hydrate the product; followed by
   (d) packaging said fully cooked product.

9. The process of claim 8, wherein said cooking step (a) is carried out at a temperature of from 200° F. to 210° F., and for a time of from 2 to 15 minutes.

10. The process of claim 8, wherein said acidification and thermal treatment is carried out at a pH of from 3.6 to 4.6, and for a time of from 1 to 5 minutes.

11. The process of claim 8, wherein said acidification and thermal treatment is carried out at a temperature of from 180° F. to 210° F., and for a time of from 1 to 5 minutes.

12. The process of claim 8, wherein said further cooking step (c) is carried out at a temperature of from 180° F. to 210° F., and for a time of from 1 to 5 minutes.

13. The process of claim 8, wherein said cooked product is packaged while maintaining it at a temperature sufficient to maintain it attenuated in microorganism and spore content.

14. The process of claim 8, additionally comprising the step of pasteurizing said cooked product after being packaged.

15. The process of claim 8, wherein said packaged product is at least one selected from the group consisting of pasta, noodles and rice.

16. The process of claim 8, wherein step (c) includes spraying an aqueous liquid on said product to further cook said product.

17. The process of claim 8, wherein said process also includes spraying said product with an edible oil.

18. The process of claim 8, wherein said process includes the step of adding at least one member of the group, of flavorants, seasonings and additional coatings to the product.

19. A cooked shelf stable farinaceous product made by the method of claim 10.

20. A packaged, cooked shelf stable farinaceous product made by the method of claim 8.

* * * * *